J. I. BURR,

Assignor to BARROWS SAVERY CO. (Limited.)

Preserving Kettle.

No. 9,552. Reissued Feb. 8, 1881.

*Witnesses:*

P. C. Dieterich

A. H. Krause.

*Inventor:*

John I. Burr.

per. Lloyd Wiegand atty.

N. PETERS, PHOTO-LITHOGRAPHER, WASHINGTON, D. C.

UNITED STATES PATENT OFFICE.

JOHN I. BURR, OF PHILADELPHIA, PENNSYLVANIA, ASSIGNOR TO BARROWS SAVERY COMPANY, (LIMITED,) OF SAME PLACE.

PRESERVING-KETTLE.

SPECIFICATION forming part of Reissued Letters Patent No. 9,552, dated February 8, 1881.

Original No. 193,804, dated August 7, 1877. Application for reissue filed November 6, 1880.

*To all whom it may concern:*

Be it known that I, JOHN I. BURR, of the city and county of Philadelphia, State of Pennsylvania, have invented certain new and useful Improvements in Preserving-Kettles; and I do hereby declare that the following is a sufficiently full, clear, and exact description thereof to enable persons skilled in the art to make and use the same.

The nature of my invention consists in forming, by casting in a single piece therewith upon a preserving-kettle provided with a bail, hinged or otherwise flexibly attached or jointed thereto, a lip or spout for pouring, and opposite to the lip or spout, by similar means, forming a handle for the purpose of tilting the kettle when suspended by the bail and pouring from the spout, which handle is looped for a twofold purpose: first, to afford a better hold in tilting the kettle; and, second, to expose such a large part of its surface for radiation of heat relatively to the small section at its points of junction with the body of the kettle that it will not become inconveniently hot to the hand; and the spout and handle are both so proportioned as to support the bail when not raised, and thus prevent the bail from becoming heated by contact with the body of the kettle. Such kettles, from their form, can be easily enameled or tinned, and having the body formed of one piece with the spout and handle, of material practically inflexible, are not liable to have their enameled or tinned surface impaired by denting or bending, and may be compactly and safely nested for transportation.

I will now proceed to more particularly describe my invention, referring in so doing to the drawings annexed and forming a part of this specification, and the letters of reference marked thereon.

Figure 1:
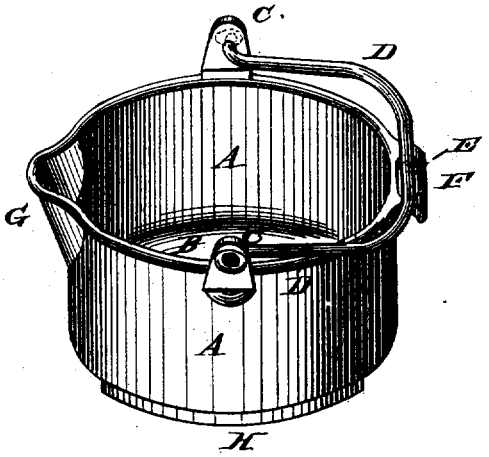
Figure 2:
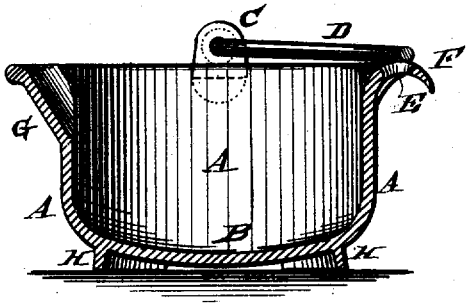

Figure 1 is a perspective view of a kettle, and Fig. 2 a vertical section.

A represents the body of the kettle, formed by casting in a single piece, having a convex bottom, B, ears C C, and a bail, D, a handle, F, formed with an opening, E, between it and the kettle-rim. This construction of handle, while sufficiently strong, exposes a smaller surface of contact to the bail when resting on it, and is more convenient to hold in tilting the kettle than a closed or solid handle. Midway in the rim, between the ears C C, and directly opposite the handle F, a spout or lip, G, is formed.

The proportions of the bail D, handle F, and spout G are such that, while the bail is so large as not to rest on the rim of the kettle, it is prevented from falling in contact with the sides of the kettle by resting upon the handle F and spout or lip G. By this means the bail rarely becomes heated when the kettle is in use upon the stove, is always in position to be readily grasped, and not so liable to break the ears from the kettle as when the motion of the bail is restricted by stops placed on or near the ears.

I do not broadly claim a projection or handle on the rim of a kettle or other culinary vessel for the purpose of tilting the same when suspended by a bail; neither do I claim, broadly, a looped handle, such handles having been applied to the sides of ductile metallic vessels below the rim. Such handles thus attached become heated and fail to support the bail and insulate it from the heat, and are therefore objectionable.

Also, I am aware that kettles have been made provided with a bail and pouring-lip, and having lugs upon them, into or between which a detachable handle could be inserted for the purpose of tilting in pouring, which devices are hereby disclaimed.

What I do claim is—

As a new article of manufacture, a cast metallic kettle having a pouring lip or spout, G, and handle F, located diametrically opposite thereto, all formed in a single piece and provided with a swinging bail, substantially as shown and described, for the purpose hereinbefore set forth.

JOHN I. BURR.

Witnesses:

WM. C. WALKER,

JACOB F. HAND.